United States Patent
Gelfand

(10) Patent No.: US 9,691,011 B2
(45) Date of Patent: Jun. 27, 2017

(54) LABEL HAVING AN ACTIVATABLE BAR CODE

(71) Applicant: Becton, Dickinson and Company, Franklin Lakes, NJ (US)

(72) Inventor: Craig A. Gelfand, Jackson, NJ (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 93 days.

(21) Appl. No.: 13/737,190

(22) Filed: Jan. 9, 2013

(65) Prior Publication Data

US 2013/0177486 A1     Jul. 11, 2013

Related U.S. Application Data

(60) Provisional application No. 61/584,981, filed on Jan. 10, 2012.

(51) Int. Cl.
*B01L 3/00* (2006.01)
*G06K 19/06* (2006.01)

(52) U.S. Cl.
CPC ...... *G06K 19/06046* (2013.01); *B01L 3/5453* (2013.01); *G06K 19/0614* (2013.01); *B01L 2300/021* (2013.01)

(58) Field of Classification Search
CPC .... B01L 3/545; B01L 3/5453; B01L 2300/00; B01L 2300/021
USPC ............... 422/547, 548, 549, 550, 568, 570; 288/74, 81, 91, 100, 101, 103
See application file for complete search history.

(56) References Cited

U.S. PATENT DOCUMENTS

| | | | |
|---|---|---|---|
| 5,276,315 A | 1/1994 | Surka | |
| 5,401,110 A | 3/1995 | Neeley | |
| 5,507,410 A | 4/1996 | Clark et al. | |
| 6,102,289 A | 8/2000 | Gabrielson | |
| 6,203,069 B1 * | 3/2001 | Outwater et al. | 283/88 |
| 6,428,640 B1 | 8/2002 | Stevens et al. | |
| 6,550,685 B1 | 4/2003 | Kindberg | |
| 6,599,476 B1 | 7/2003 | Watson | |
| 6,599,481 B2 * | 7/2003 | Stevens et al. | 422/549 |
| 6,758,400 B1 | 7/2004 | Reasoner | |
| 2001/0021531 A1 | 9/2001 | Goldsmith | |
| 2003/0039583 A1 | 2/2003 | Miller et al. | |

(Continued)

FOREIGN PATENT DOCUMENTS

| | | |
|---|---|---|
| EP | 0736854 A1 | 10/1996 |
| EP | 1605396 A2 | 12/2005 |

(Continued)

*Primary Examiner* — Jill Warden
*Assistant Examiner* — Dwayne K Handy
(74) *Attorney, Agent, or Firm* — The Webb Law Firm

(57) ABSTRACT

A label including a label body having an upper surface and a bottom surface and a light-transmissive portion and an opaque portion is disclosed. The label includes an adhesive disposed on at least a portion of the bottom surface for affixing the label body to a portion of a container. An excitation-activatable material arranged to contain machine readable information is disposed on at least a portion of the upper surface of the light-transmissive portion of the label body. The machine readable information is undetected by a detector in ambient light, and detectable by the detector upon application of an excitation wavelength to the excitation-activatable material.

35 Claims, 5 Drawing Sheets

(56) References Cited

U.S. PATENT DOCUMENTS

| | | | |
|---|---|---|---|
| 2003/0074223 A1* | 4/2003 | Hickle et al. | 705/2 |
| 2004/0215480 A1 | 10/2004 | Kadaba | |
| 2005/0121528 A1 | 6/2005 | Lubow | |
| 2005/0196323 A1 | 9/2005 | Itoh | |
| 2005/0230962 A1* | 10/2005 | Berson | 283/81 |
| 2005/0252973 A1 | 11/2005 | Itoh | |
| 2006/0267753 A1 | 11/2006 | Hussey et al. | |
| 2008/0121688 A1 | 5/2008 | Harrop | |
| 2008/0128492 A1* | 6/2008 | Roth et al. | 235/380 |
| 2008/0188814 A1* | 8/2008 | Lavi-Loebl | A61M 5/28 604/189 |

FOREIGN PATENT DOCUMENTS

| | | |
|---|---|---|
| JP | 08-329210 | 12/1996 |
| JP | 2000-098898 | 4/2000 |
| JP | 2002-259919 | 9/2002 |
| JP | 2002-318540 | 10/2002 |
| JP | 2003-112773 | 4/2003 |

* cited by examiner

LABEL HAVING AN ACTIVATABLE BAR CODE

CROSS-REFERENCE TO RELATED APPLICATION

The present application claims priority to U.S. Provisional Patent Application No. 61/584,981, filed Jan. 10, 2012, entitled "Label Having An Activatable Barcode", the entire disclosure of which is hereby incorporated by reference.

BACKGROUND OF THE INVENTION

1. Field of the Invention

The present invention relates generally to labels for use with specimen collection containers and, more particularly, to labels having an excitation-activatable material disposed thereon.

2. Description of Related Art

It is common for medical specimens to be collected by a technician in a collection container for subsequent testing. Blood specimens are typically collected in blood collection tubes. These tubes are typically transported to an analytical testing facility with documentation relating to the intended testing procedure to be performed on the specimen, as well as patient identifier information. Information, such as the type of specimen collection container, the intended testing procedure, and/or patient identifier information, can be reduced to a scannable bar code which can be placed on the blood collection tube. The bar code is typically printed on a label and applied to the tube by use of an adhesive, where it can be conveniently scanned by a bar code scanner to provide the requisite information to the medical technician. In many instances, automated testing equipment is used for clinical testing of multiple sampling containers in an assembly line configuration. Such automated equipment typically involves some form of bar code scanning in order to associate the proper information with the correct sample. Bar code scanning may be performed with a hand-held scanner or with a fixed bar code reader.

Small volume blood collection containers have a limited surface area on which a barcode may be disposed. This is often insufficient to allow for all of the required information to be provided on a specimen collection container. One aspect of particular concern is that of "overlabeling", when multiple barcodes and/or relevant indicia identifiers are provided on a single specimen collection container. In certain situations, both computer-readable barcode information and human-readable information pertaining to testing procedures are both required to be provided on a label, thereby increasing the overall size of the required label. Overlabeling and the use of large labels may lead to obscuring visual access to the contents of a specimen collection container. This can cause clinical errors during specimen draw as well as diagnostic errors during subsequent analysis and/or specimen testing.

Accordingly, a need exists for an improved label that provides both the requisite computer-readable barcode information and the human-readable testing information in a compact format without obscuring the contents of the specimen collection container.

SUMMARY OF THE INVENTION

Accordingly, there is a general need for a label for medical specimen containers that has a portion for viewing the contents of a container and contains machine readable information in that same portion.

In accordance with an embodiment of the present invention, a machine readable label includes a label body having an upper surface and a bottom surface, with the label body including a light-transmissive portion and an opaque portion. The label includes an adhesive disposed on at least a portion of the bottom surface for affixing the label body to a portion of a container. The label also includes an excitation-activatable material arranged to contain machine readable information disposed on at least a portion of the upper surface of the light-transmissive portion, wherein the machine readable information is undetected by a detector in ambient light, and detectable by the detector upon application of an excitation wavelength to the excitation-activatable material.

In certain configurations, the opaque portion at least partially surrounds the light-transmissive portion. In other configurations, the opaque portion is adjacent the light-transmissive portion. Optionally, the upper surface of the opaque portion may include indicia printed thereon. The indicia may include intended fill volume information. In certain configurations, the label is disposed on a specimen collection container, and a content of the specimen collection container may be viewable through the light-transmissive portion. In certain configurations, the specimen collection container is a blood collection container.

The machine readable information may include at least one barcode. Optionally, the machine readable information includes a plurality of barcodes. The adhesive may be a light-transmissive adhesive, and the adhesive may be disposed at least partially about a perimeter of the label body. In certain configurations, the excitation wavelength is less than about 400 nm. In other configurations, the excitation wavelength is from about 10 nm to about 400 nm. In certain configurations, the excitation wavelength is greater than about 700 nm, such as an excitation wavelength of from about 750 nm to about 1 mm.

In accordance with another embodiment of the present invention, a machine readable label includes a light-transmissive label body having an upper surface and a bottom surface. The label includes an adhesive disposed on at least a portion of the bottom surface for affixing the label body to a portion of a container, and an excitation-activatable material may be arranged to contain machine readable information disposed on at least a portion of the upper surface. The machine readable information may be undetected by a detector in ambient light, and detectable by the detector upon application of an excitation wavelength to the excitation-activatable material.

The light-transmissive portion may include indicia printed thereon. The indicia may include intended fill volume information. The label may be disposed on a specimen collection container, and a content of the specimen collection container may be viewable through the light-transmissive portion. In one configuration, the specimen collection container is a blood collection container. Optionally, the machine readable information includes at least one barcode. In certain configurations, the machine readable information includes a plurality of barcodes. In one configuration, the adhesive is a light-transmissive adhesive and the adhesive may be disposed at least partially about a perimeter of the label body.

In certain configurations, the excitation wavelength is less than about 400 nm, such as an excitation wavelength of from about 10 nm to about 400 nm. In other configurations, the excitation wavelength is greater than about 700 nm, such as from about 750 nm to about 1 mm.

In accordance with another embodiment of the present invention, a specimen collection container includes an open top end, a closed bottom end, and a sidewall extending therebetween having an exterior surface and defining a container interior adapted to receive a specimen therein. The specimen collection container also includes a machine readable label disposed on a portion of the exterior surface. The label includes a label body having an upper surface and a bottom surface, with the label body including a light-transmissive portion and an opaque portion. An adhesive is disposed on at least a portion of the bottom surface affixing the label body to a portion of the exterior surface of the sidewall of the container. An excitation-activatable material arranged to contain machine readable information is disposed on at least a portion of the upper surface of the light-transmissive portion, with the machine readable information being undetected by a detector in ambient light, and detectable by the detector upon application of an excitation wavelength to the excitation-activatable material.

In certain configurations, a closure for covering the open top end of the specimen collection container is provided. Contents of the specimen collection container may be viewable through at least a portion of the label.

In accordance with yet another embodiment of the present invention, a specimen collection container includes an open top end, a closed bottom end, and a sidewall extending therebetween having an exterior surface and defining a container interior adapted to receive a specimen therein. A machine readable label is disposed on a portion of the exterior surface of the container. The label includes a light-transmissive label body having an upper surface and a bottom surface. An adhesive is disposed on at least a portion of the bottom surface affixing the label body to a portion of the exterior surface of the sidewall of the container. An excitation-activatable material is arranged to contain machine readable information disposed on at least a portion of the upper surface, wherein the machine readable information is undetected by a detector in ambient light, and detectable by the detector upon application of an excitation wavelength to the excitation-activatable material.

In certain configurations, a closure for covering the open top end of the specimen collection container is provided. The contents of the specimen collection container may be viewable through at least a portion of the label.

Further details and advantages of the invention will become clear upon reading the following detailed description in conjunction with the accompanying drawing figures, wherein like parts are designated with like reference numerals throughout.

DETAILED DESCRIPTION OF THE INVENTION

Figure 1:
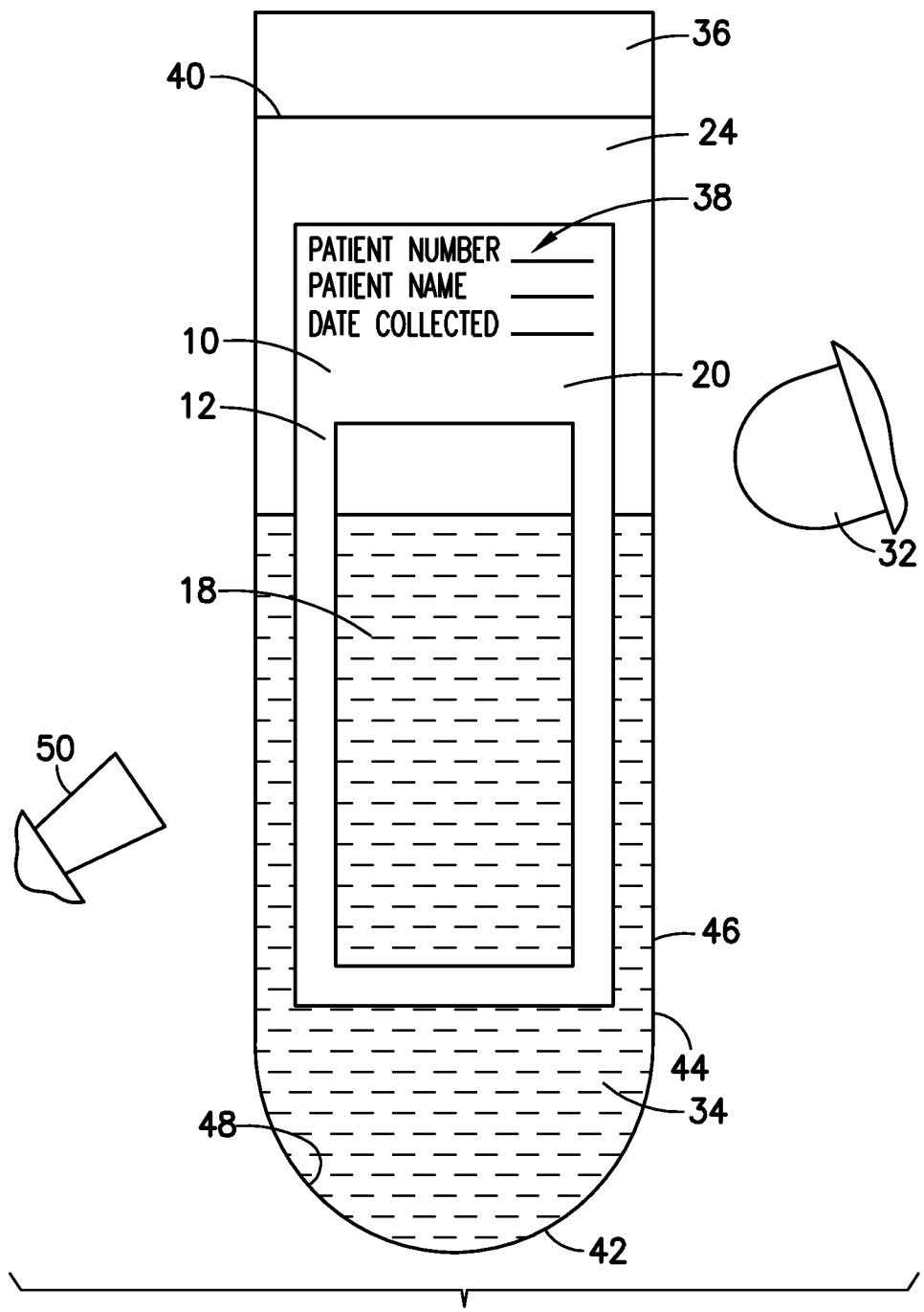
FIG. 1 is a schematic view of a specimen collection container with a label having excitation-activatable material in an initial state undetected by a detector in accordance with an embodiment of the present invention.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

With reference to FIGS. 1-4, a label 10 of the present invention is intended for application to a specimen collection container 24, such as a blood collection tube. With specific reference to FIG. 5, a label 10 includes a label body 12 having an upper surface 14 on which indicia may be disposed and a bottom surface 16 on which an adhesive 22 may be disposed. In one configuration, the label body 12 includes a light-transmissive portion 18 adapted to allow incident light to substantially pass therethrough. The light-transmissive portion 18 may be substantially clear, transparent, or translucent. The light-transmissive portion 18 may include a thin polymeric material. The label body 12 may also include an opaque portion 20 which may be formed of a paper composition or a substantially opaque polymeric material. In a further configuration, the light-transmissive portion 18 and the opaque portion 20 may be formed from the same material, such as polymeric film, with the light-transmissive portion 18 being clear and opaque portion 20 containing pigments. The opaque portion 20 of the label body 12 may be provided adjacent the light-transmissive portion 18. In one configuration, the opaque portion 20 may at least partially surround the light-transmissive portion 18, forming a clear window bounded by an opaque border.

The bottom surface 16 of the label body 12 may include an adhesive 22 disposed thereon for securing the label 10 to a specimen collection container 24, as shown in FIGS. 1-4. The specimen collection container 24 may include an open top end 40, a closed bottom end 42, and a sidewall 44 extending therebetween having an exterior surface 46 and defining a container interior 48 adapted to receive a specimen 34 therein. The sidewall 44 may include at least one region that is light-transmissive or substantially clear. A closure 36 for covering the open top end 40 of the specimen collection container 24 may be included, as is conventionally known.

The adhesive 22 may be provided as a continuous layer across the bottom surface 16 or may be provided in a discontinuous pattern, such as disposed at least partially about the perimeter of the bottom surface 16 of the label body 12. The adhesive 22 may have other configurations, such as dots of adhesive, discontinuous lines of adhesive, or the like. In one embodiment, the adhesive 22 may be substantially light-transmissive and/or substantially optically clear, the importance of which will be discussed herein. Referring to FIGS. 1-4, the label 10 may be applied to the specimen collection container 24 such that the specimen 34 of the specimen collection container 24 may be viewable through at least a portion of the label 10. Label 10 may be fixed to container 24 by adhesive 22 adhering to exterior surface 46 of the sidewall 44.

Figure 2:
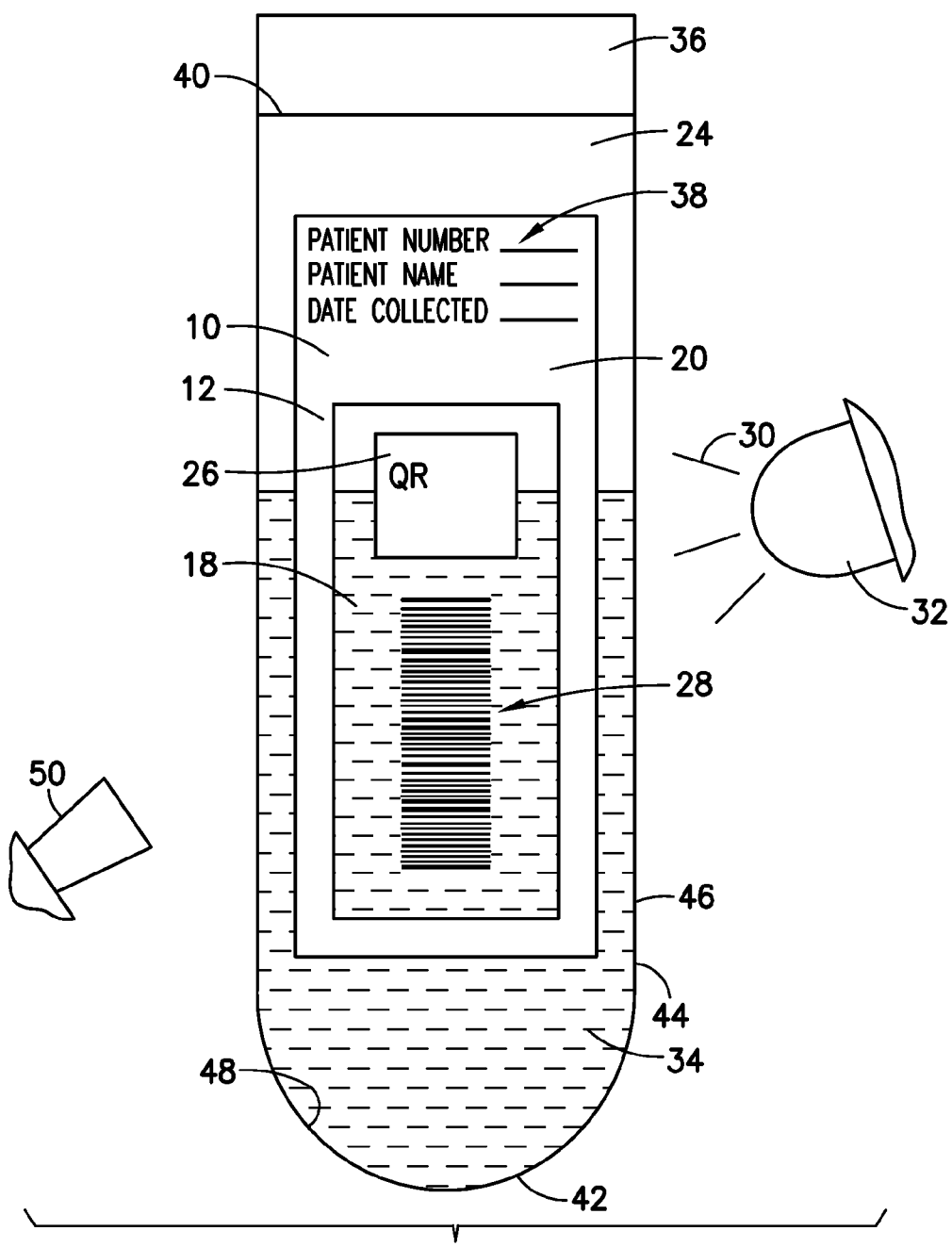
FIG. 2 is a schematic view of the specimen collection container and label of FIG. 1 having excitation-activatable material in an activated state detected by the detector in accordance with an embodiment of the present invention.

The upper surface 14 of the label body 12 may include indicia printed thereon, as shown in FIGS. 1-2. In one configuration, the opaque portion 20 may include human-readable indicia 38 printed thereon, such as intended fill volume information of the specimen collection container 24 to which the label 10 is to be applied. In another configuration, the indicia 38 may include patient identifier information such as a patient's name and/or patient identification number. The indicia 38 may also include information specific to the intended testing procedure to be performed on the specimen, the date the sample was collected, additives disposed in the specimen collection container 24, or other relevant information. The indicia 38 may include pre-printed information, such as part and lot numbers, date and country of manufacture, safety information, or branding identifiers.

The light-transmissive portion 18 of the label body 12 may also include indicia printed thereon in the form of machine-readable information 28. In one configuration, the indicia disposed on the light-transmissive portion 18 may include excitation-activatable material 26. The excitation-activatable material 26 may be substantially undetectable by a detector 50 in ambient light, such as in normal viewing conditions as shown in FIG. 1, and may be detectable by the detector 50 upon application of an excitation wavelength thereto, as shown in FIG. 2. In one configuration, the excitation-activatable material 26 is arranged to contain machine readable information 28 in the form of a barcode. In a further configuration, the excitation-activatable material 26 is arranged to contain a plurality of barcodes which may be detected by a corresponding computer identifier or may become visible to the human eye when activated, as shown in FIG. 2. In still a further configuration, the machine readable information 28 may include at least one QR code, at least one Aztec code, or other optical machine readable formats, such as UPC, EAN, EANUCC, CODABAR, CODE 39, CODE 128, Interleaved 2/5, Discrete 2/5, Postnet, BPO, CODE 49, CODE 16K, PDF417, AZTEC, or DATAMATRIX. The information embedded in the machine readable information 28 may relate to specimen identification number, patient or subject identification number, patient name, indication of test performed or to be performed, indication of type of specimen or sample, indication of location of sampling, method of sampling, blood type, sex of patient or subject, age of patient or subject, or any other potentially relevant information.

The excitation-activatable material 26 may be any suitable material that fluoresces and/or illuminates relative to the detector 50 in response to electromagnetic radiation of a selected excitation wavelength being incident thereon. The excitation wavelength may be electromagnetic radiation of a certain wavelength and/or a certain range of wavelengths. Ambient light should be understood as environmental light from conventional substantially white lighting and/or natural sunlight. In one configuration, the excitation-activatable material 26 may fluoresce and/or illuminate in response to an excitation wavelength 30 produced by an electromagnetic source 32.

The excitation wavelengths 30 will depend on the corresponding excitation-activatable material 26. In one embodiment, the excitation-activatable material 26 may fluoresce and/or illuminate in response to application of an excitation wavelength 30 in ultraviolet (UV) spectrum thereon. For example, the excitation wavelength 30 may be less than about 400 nm. The excitation wavelength 30 may be from about 10 nm to about 400 nm. In accordance with another embodiment, the excitation-activatable material 26 may fluoresce and/or illuminate in response to application of an excitation wavelength 30 in infrared (IR) spectrum thereon. For example, the excitation wavelength 30 may be greater than about 700 nm. The excitation wavelength 30 may be from about 750 nm to about 1 mm.

In one embodiment, the excitation-activatable material 26 may include a fluorescent ink and the machine readable information 28 may include barcode information. A barcode line scanner could be used, as a detector 50, in conjunction with a black light, as an electromagnetic source 32. Optionally, a contrast filter (not shown) may be used with the detector 50 to improve visualization of the fluorescent barcode. While in this example the excitation wavelength 30 is in the ultraviolet range, other wavelength ranges could be used with other excitation-activatable materials 26.

With specific reference to FIGS. 1-2, the label 10 may be disposed on a specimen collection container 24, and a specimen 34 of the specimen collection container may be viewable through the light-transmissive portion 18, thereby enabling a phlebotomist, lab technician, automated imaging system, or the like to view the specimen 34 of the specimen collection container 24. Although the specimen collection container 24 has been previously described herein as a blood collection container, the specimen collection container 24 may be any biological specimen container, such as a petri dish, collection cup, syringe, bottle, vial, test tube, sample bag, or the like. By providing the machine readable information 28 in the form of excitation-activatable material 26 disposed over the light-transmissive portion 18 of the label body 12, a user may view the specimen 34 of the specimen collection container 24 without interference from the machine readable information 28 in ambient lighting conditions, as shown in FIG. 1. A user may view a sample level, determine whether the container 24 had been filled or separated properly, and/or visually or spectrally analyze the specimen 34 of the specimen collection container 24 through the light-transmissive portion 18 in ambient light, shown in FIG. 1. Upon application of an excitation wavelength 30 from the electromagnetic source 32, the machine readable information 28, provided as excitation-activatable material 26, becomes visible to the detector 50, as shown in FIG. 2.

Figure 3:
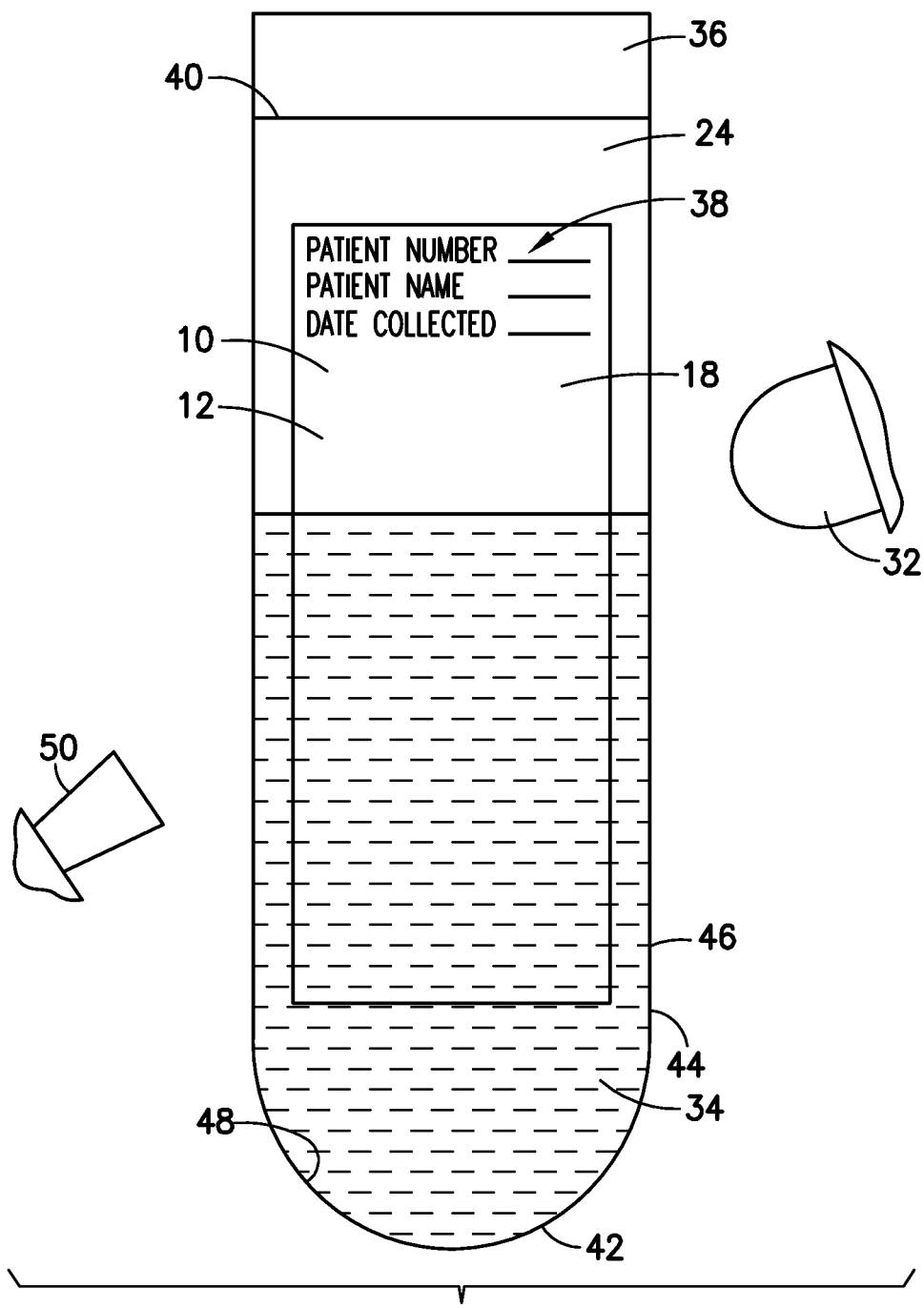
FIG. 3 is a schematic view of a specimen collection container with a label having excitation-activatable material in an initial state undetected by a detector in accordance with an embodiment of the present invention.
Figure 4:
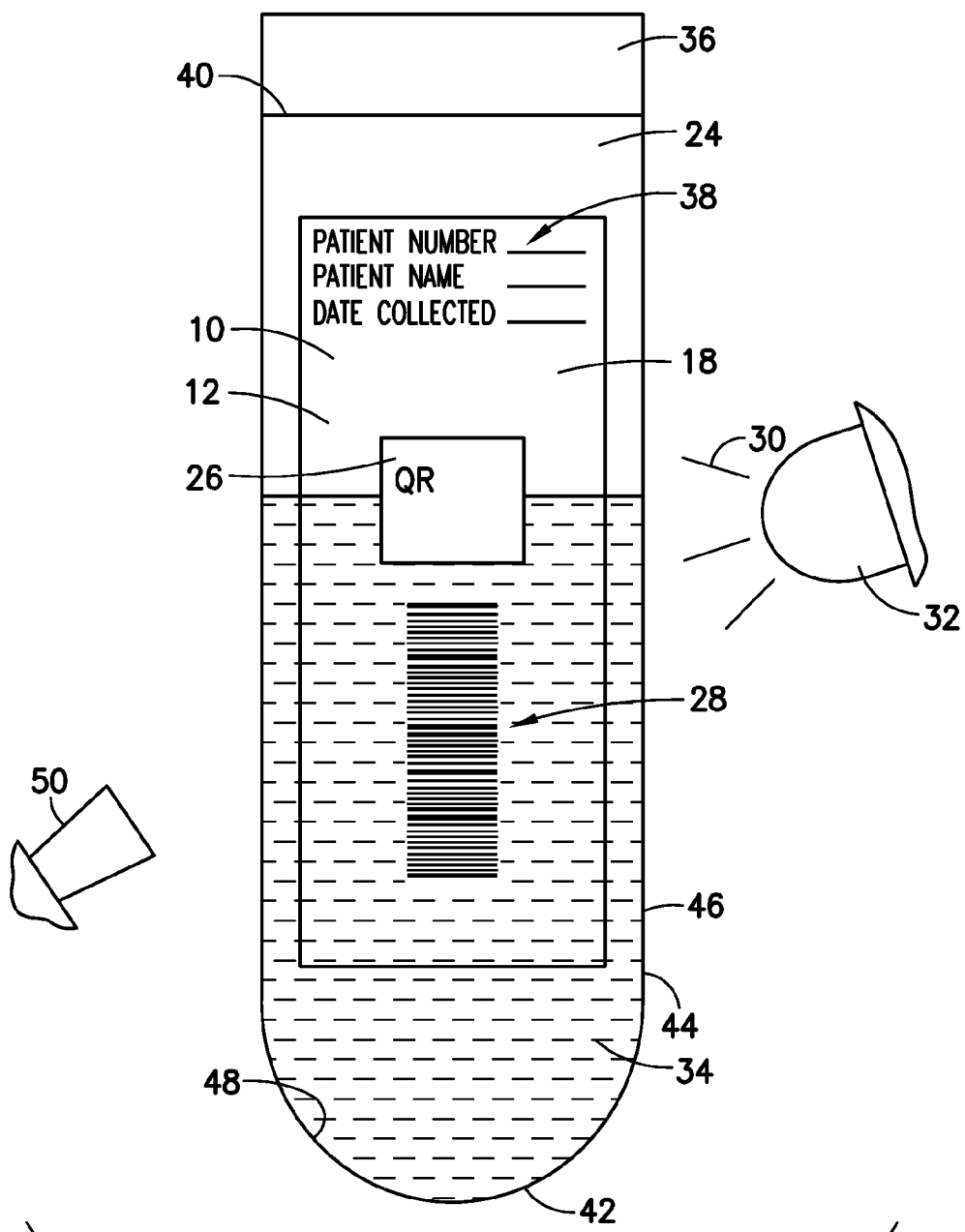
FIG. 4 is a schematic view of the specimen collection container and label of FIG. 3 having excitation-activatable material in an activated state detected by the detector in accordance with an embodiment of the present invention.
Figure 5:
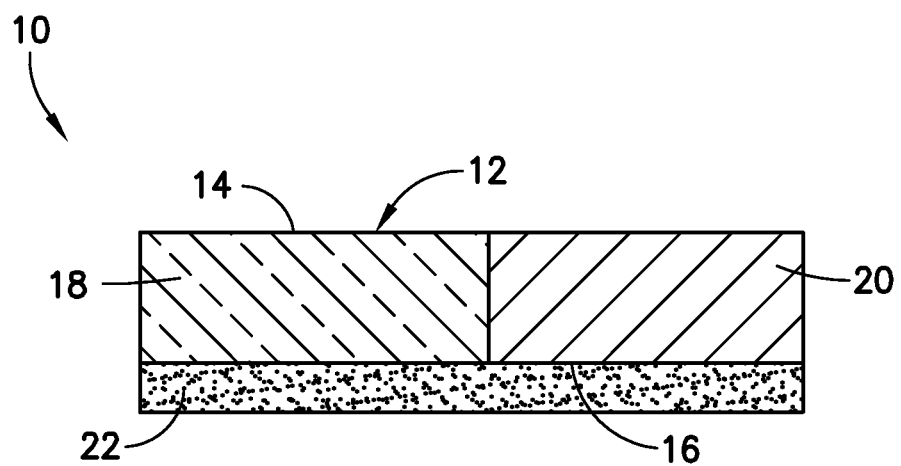
FIG. 5 is a cross-sectional view of a label having excitation-activatable material with machine readable information in accordance with an embodiment of the present invention.

It is advantageous to use the surface area of the label 10 and container 24 for more than one purpose simultaneously. Since barcodes are not human readable, there is no need to have them visible to humans. Therefore, printing information with fluorescent ink or other fluorescent material lacking any visible pigment would leave the information invisible in regular ambient light. If printed on a clear label 10, as shown in FIGS. 3-4, then maximum viewing of the specimen 34 of the specimen collection container 24 may be established. In ambient light, the label 10 may be a clear window through which a phlebotomist, lab technician, automated imaging system, or the like would be able to see the sample inside the container 24. A user could see blood level, know whether the container 24 had been filled or separated properly, and could judge the color of a specimen 34, e.g., to visually or spectrally judge the blood or other sample.

Referring specifically to FIGS. 3-4, the label body 12 is entirely light-transmissive. The excitation-activatable material 26 includes the machine readable information 28 being invisible during ambient lighting conditions, as shown in FIG. 3, and machine readable information 28 being visible when a corresponding excitation wavelength 30 generated by the electromagnetic source 32 is incident on the excitation-activatable material 26, as shown in FIG. 4. In this embodiment, indicia in the form of human-readable information 38 as well as indicia in the form of excitation-activatable material 26 including machine readable information 28 may be disposed on the upper surface 14 of the label body 12. In this configuration, the human-readable information 38 is visible at all times, in both ambient lighting conditions and upon application of an excitation wavelength 30 thereto. The excitation-activatable material 26 including the machine readable information 28 is substantially invisible in ambient lighting conditions and undetectable by the detector 50, as shown in FIG. 3. As shown in FIG. 4, the excitation-activatable material 26 including the machine readable information 28 is activated and detectable by the detector 50 upon application of the excitation wavelength 30 thereto.

While FIGS. 1-4 show a label 10 adhering to a portion of the specimen collection container 24, it is envisioned that the label 10 could be enlarged and formatted to cover an increased area, or to completely wrap around the specimen collection container 24.

While several embodiments of labels having excitation-activatable material with machine readable information were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

What is claimed is:

1. A machine readable label, comprising:
  a label body having an upper surface and a bottom surface, the label body comprising a light-transmissive portion and an opaque portion, wherein the light-transmissive portion spans the upper surface and the bottom surface, the opaque portion comprising human readable indicia disposed thereon;
  an adhesive disposed on at least a portion of the bottom surface for affixing the label body to a portion of a container;
  an excitation-activatable material arranged to contain machine readable information disposed on at least a portion of the upper surface of the light-transmissive portion,
  wherein the machine readable information is undetected by a detector in ambient light, and detectable by the detector upon application of an excitation wavelength to the excitation-activatable material, and
  wherein the machine readable information comprises patient identifier information.

2. The machine readable label of claim 1, wherein the opaque portion at least partially surrounds the light-transmissive portion.

3. The machine readable label of claim 1, wherein the opaque portion is adjacent the light-transmissive portion.

4. The machine readable label of claim 1, wherein the upper surface of the opaque portion comprises the human readable indicia printed thereon.

5. The machine readable label of claim 4, wherein the indicia comprises intended fill volume information.

6. The machine readable label of claim 1, wherein the label is disposed on a specimen collection container, and wherein a content of the specimen collection container is viewable through the light transmissive portion.

7. The machine readable label of claim 1, wherein the specimen collection container is a blood collection container.

8. The machine readable label of claim 1, wherein the machine readable information comprises at least one barcode.

9. The machine readable label of claim 1, wherein the machine readable information comprises a plurality of barcodes.

10. The machine readable label of claim 1, wherein the adhesive is a light transmissive adhesive.

11. The machine readable label of claim 1, wherein the adhesive is disposed at least partially about a perimeter of the label body.

12. The machine readable label of claim 1, wherein the excitation wavelength is less than about 400 nm.

13. The machine readable label of claim 1, wherein the excitation wavelength is from about 10 nm to about 400 nm.

14. The machine readable label of claim 1, wherein the excitation wavelength is greater than about 700 nm.

15. The machine readable label of claim 1, wherein the excitation wavelength is from about 750 nm to about 1mm.

16. A machine readable label, comprising:
  a label body having an upper surface and a bottom surface, the label body comprising a light-transmissive portion that spans the upper surface and the bottom surface;
  an adhesive disposed on at least a portion of the bottom surface for affixing the label body to a portion of a container, wherein the adhesive is a light transmissive adhesive;
  an excitation-activatable material arranged to contain machine readable information disposed on at least a portion of the upper surface,
  wherein the machine readable information is undetected by a detector in ambient light, and detectable by the detector upon application of an excitation wavelength to the excitation-activatable material, and
  wherein the machine readable information comprises patient identifier information.

17. The machine readable label of claim 16, wherein the label body further comprises a light-transmissive portion and an opaque portion, said opaque portion at least partially surrounding the light-transmissive portion.

18. The machine readable label of claim 16, wherein the label body further comprises a light-transmissive portion and an opaque portion, and wherein the opaque portion is adjacent the light-transmissive portion.

19. The machine readable label of claim 18, wherein the opaque portion comprises indicia printed thereon.

20. The machine readable label of claim 19, wherein the indicia comprises intended fill volume information.

21. The machine readable label of claim 16, wherein the label is disposed on a specimen collection container, and wherein a content of the specimen collection container is viewable through the light transmissive portion.

22. The machine readable label of claim 21, wherein the specimen collection container is a blood collection container.

23. The machine readable label of claim 16, wherein the machine readable information comprises at least one barcode.

24. The machine readable label of claim 16, wherein the machine readable information comprises a plurality of barcodes.

25. The machine readable label of claim 16, wherein the adhesive is disposed at least partially about a perimeter of the label body.

26. The machine readable label of claim 16, wherein the excitation wavelength is less than about 400 nm.

27. The machine readable label of claim 16, wherein the excitation wavelength is from about 10 nm to about 400 nm.

28. The machine readable label of claim 16, wherein the excitation wavelength is greater than about 700 nm.

29. The machine readable label of claim 16, wherein the excitation wavelength is from about 750 nm to about 1 mm.

30. A specimen collection container, comprising:
an open top end, a closed bottom end and a sidewall extending therebetween having an exterior surface and defining a container interior adapted to receive a specimen therein, and
a machine readable label disposed on a portion of the exterior surface, the label comprising:
a label body having an upper surface and a bottom surface, the label body comprising a light-transmissive portion and an opaque portion, the light-transmissive portion spans the upper surface and the bottom surface, the opaque portion comprising human readable indicia disposed thereon,
an adhesive disposed on at least a portion of the bottom surface affixing the label body to a portion of the exterior surface of the sidewall of the container, and
an excitation-activatable material arranged to contain machine readable information disposed on at least a portion of the upper surface of the light-transmissive portion,
wherein the machine readable information is undetected by a detector in ambient light, and detectable by the detector upon application of an excitation wavelength to the excitation-activatable material, and
wherein the machine readable information comprises patient identifier information.

31. The specimen collection container of claim 30, further comprising a closure for covering the open top end of the specimen collection container.

32. The specimen collection container of claim 30, wherein a contents of the specimen collection container is viewable through at least a portion of the label.

33. A specimen collection container, comprising:
an open top end, a closed bottom end and a sidewall extending therebetween having an exterior surface and defining a container interior adapted to receive a specimen therein, and
a machine readable label disposed on a portion of the exterior surface, the label comprising:
a label body having an upper surface and a bottom surface, the label body comprising a light-transmissive portion that spans the upper surface and the bottom surface;
an adhesive disposed on at least a portion of the bottom surface affixing the label body to a portion of the exterior surface of the sidewall of the container, wherein the adhesive is a light transmissive adhesive, and
an excitation-activatable material arranged to contain machine readable information disposed on at least a portion of the upper surface,
wherein the machine readable information is undetected by a detector in ambient light, and detectable by the detector upon application of an excitation wavelength to the excitation-activatable material, and
wherein the machine readable information comprises patient identifier information.

34. The specimen collection container of claim 33, further comprising a closure for covering the open top end of the specimen collection container.

35. The specimen collection container of claim 33, wherein a contents of the specimen collection container is viewable through at least a portion of the label.

\* \* \* \* \*